(12) United States Patent
Qin et al.

(10) Patent No.: US 10,411,500 B2
(45) Date of Patent: Sep. 10, 2019

(54) ELECTRIC VEHICLE FAST CHARGING STATION WITH SOLAR ENERGY SYSTEM AND ITS METHOD

(71) Applicants: Yu Qin, Troy, OH (US); Shanshan Du, Troy, OH (US)

(72) Inventors: Yu Qin, Troy, OH (US); Shanshan Du, Troy, OH (US)

(73) Assignees: Yu Qin, Troy, OH (US); Shanshan Du, Troy, OH (US)

(*) Notice: Subject to any disclaimer, the term of this patent is extended or adjusted under 35 U.S.C. 154(b) by 249 days.

(21) Appl. No.: 15/615,623

(22) Filed: Jun. 6, 2017

(65) Prior Publication Data

US 2017/0366039 A1 Dec. 21, 2017

Related U.S. Application Data

(60) Provisional application No. 62/350,932, filed on Jun. 16, 2016.

(51) Int. Cl.
*H02J 7/35* (2006.01)
*H02J 3/32* (2006.01)
*H02J 3/36* (2006.01)
*H02J 3/38* (2006.01)
*H02J 7/00* (2006.01)
*B60L 53/10* (2019.01)
*H02M 7/5387* (2007.01)
*H02M 1/00* (2006.01)
*H02M 1/08* (2006.01)
*H02M 7/219* (2006.01)
*H02M 7/797* (2006.01)

(52) U.S. Cl.
CPC .............. *H02J 7/35* (2013.01); *B60L 53/11* (2019.02); *H02J 3/36* (2013.01); *H02J 3/385* (2013.01); *H02J 7/0027* (2013.01); *H02J 3/32* (2013.01); *H02J 3/383* (2013.01); *H02M 1/08* (2013.01); *H02M 7/219* (2013.01); *H02M 7/5387* (2013.01); *H02M 7/797* (2013.01); *H02M 2001/0009* (2013.01); *Y02T 10/7055* (2013.01); *Y02T 90/127* (2013.01)

(58) Field of Classification Search
CPC .... H02J 7/35; H02J 7/0027; H02J 3/36; H02J 3/385; B60L 53/11; Y02T 10/7055; Y02T 90/127; H02M 7/219; H02M 7/797; H02M 2001/0009; H02M 1/08; H02M 7/5387
See application file for complete search history.

(56) References Cited

U.S. PATENT DOCUMENTS 7,768,800 B2 * 8/2010 Mazumder ............ H02M 5/458
363/17
8,334,616 B2 * 12/2012 Mansoor ................ H02M 1/10
307/80

(Continued)

*Primary Examiner* — Michael C Zarroli

(57) ABSTRACT

A high power EV fast charging station with solar energy system (EVFCS-SES) having a HV DC bus, several EVFCS-SES cells connecting in parallel, and a storage battery is operated as either a solar energy generation system, or a solar energy generation plus a direct storage battery charger, or as a high power EV fast charger with solar energy/storage battery/AC grid power, or a PWM rectifier battery charger to perform EV battery charging and solar energy generation for AC grid power.

19 Claims, 12 Drawing Sheets

(56) References Cited

U.S. PATENT DOCUMENTS

| | | | | |
|---|---|---|---|---|
| 8,493,020 B2* | 7/2013 | Lee | ................... | H01M 10/465 |
| | | | | 307/66 |
| 8,754,549 B2* | 6/2014 | Kawakami | ................ | G05F 1/67 |
| | | | | 307/110 |
| 8,941,263 B2* | 1/2015 | Lee | .......................... | H02J 3/32 |
| | | | | 307/140 |
| 8,970,161 B1* | 3/2015 | Cuadros | ................ | H02J 7/0068 |
| | | | | 320/101 |
| 9,153,847 B2* | 10/2015 | Harty | .................. | H01M 10/465 |
| 9,783,066 B2* | 10/2017 | Kim | ...................... | B60W 20/00 |
| 9,966,875 B2* | 5/2018 | Wang | .................... | H02M 7/483 |
| 9,977,452 B2* | 5/2018 | Abu Qahouq | ............ | G05F 1/67 |
| 2004/0207366 A1* | 10/2004 | Sung | ........................ | H02J 7/35 |
| | | | | 320/140 |
| 2011/0133684 A1* | 6/2011 | Eikeland | ................ | B60L 53/11 |
| | | | | 320/101 |
| 2015/0066228 A1* | 3/2015 | Clifton | ..................... | G05F 1/66 |
| | | | | 700/295 |

* cited by examiner

| Description | Mode | $SW_S$ | $SW_{31}$ | $SW_{12}$ | $SW_{13}$ | $SW_{21}$ | $SW_{22}$ | $SW_{23}$ | ... | $SW_{n1}$ | $SW_{n2}$ | $SW_{n3}$ |
|---|---|---|---|---|---|---|---|---|---|---|---|---|
| Solar power generation mode: when solar energy is present; EV is not in charging process; storage battery is full, MFPCS 1 ... MFPCS n convert solar 1 energy, ..., solar n energy to AC power. | 1 | 0 | 0 | 1 | 0 | 0 | 1 | 0 | ... | 0 | 1 | 0 |
| Solar energy generation plus direct storage battery charger mode: when solar energy is present; EV is not in charging process; storage battery is not full, MFPCS 1...MFPCS n use part of solar energy to charge storage battery while convert the rest to AC power | 2 | 1 | 0 | 1 | 1 | 0 | 1 | 1 | ... | 0 | 1 | 1 |
| EV battery charger using solar energy mode: when solar energy and EV charging are present, MFPCS 1 charges EV battery 1 using solar energy from cell 1 through HV DC Bus and MFPCS 2... MFPCS n use part of solar energy from cell 2, ... ,cell n to support HV DC Bus while convert the rest to AC power. | 3 | 0 | 1 | 0 | 1 | 0 | 1 | 1 | ... | 0 | 1 | 1 |
| EV battery charger using storage battery and AC grid power mode: when solar 1 ... solar n are not present; EV battery is in charging process, MFPCS 1 charges EV battery 1 through HV DC Bus supported by storage battery and PWM rectifier, MFPCS 2 uses AC grid power to support HV DC Bus. | 4 | 1 | 1 | 0 | 1 | 0 | 1 | 1 | ... | 0 | 0 | 0 |
| PWM rectifier battery charger mode: when solar energy and EV charging process are not present; storage battery is not full, MFPCS 1 chargers storage battery with AC grid power. | 5 | 1 | 0 | 1 | 1 | 0 | 0 | 0 | ... | 0 | 0 | 0 |

FIG. 3

| Transformer Re-Configuration Switches | | | | | | | | | Effective Transformer Turns Ratio | Battery Voltage Range |
|---|---|---|---|---|---|---|---|---|---|---|
| CT1 | CT2 | CT3 | CT4 | CT5 | CT6 | CT7 | CT8 | CT9 | | |
| 0 | 1 | 1 | 0 | 1 | 1 | 0 | 1 | 1 | 0.75 | 150V – 210V |
| 1 | 0 | 0 | 0 | 1 | 1 | 1 | 0 | 0 | 1.5 | 300V – 420V |
| 1 | 0 | 0 | 1 | 0 | 0 | 1 | 0 | 0 | 3.0 | 600V – 840V |

ELECTRIC VEHICLE FAST CHARGING STATION WITH SOLAR ENERGY SYSTEM AND ITS METHOD

CROSS-REFERENCE TO RELATED APPLICATIONS

This application claims the benefit of U.S. Provisional Application 62/350,932 and hereby incorporates the application by reference.

TECHNICAL FIELD

The present invention relates to high power Electric Vehicle (EV) fast charger operating with solar energy system capable of charging EV battery and supplying AC grid power, such as but not limited to EV fast charging station with solar energy system and its method.

BACKGROUND

At the starting of the 21st century, the awareness for electric and other alternative fuel vehicles has increased due to growing concern over the problems associate with hydrocarbon-fueled vehicles harming to the environment caused by their CO2 emissions and realizing the benefit that electrical vehicles (EV) offers as it can greatly increase Mile Per Gallon Equivalent (MPGe). However the shortcoming of electrical vehicles (EV) is still the limitation of driving range on their fully charged batteries and long charging time. The range is usually between 60 miles to 300 miles per charge while charging time is between 2 hours to 10 hours or more. Therefore, a high power EV fast charger is the best solution for solving the feasibility of Electric Vehicle (EV).

Traditional high power EV fast charger uses AC grid as power source. It converts AC grid power to DC power when charging EV battery. It suffers two major drawbacks: (1) since many charging stations are connected to an AC grid power feeder, when they operate at same time, particularly during on-peak hour, the AC grid power feeder may not have enough power supporting all EV chargers; (2) If AC grid power is produced by coal or other fossil fuel, the Mile Per Gallon Equivalent (MPGe) of EV is reduced significantly, which severely cuts the benefit of EV itself and even defeat the purpose of using EV. In order to mitigate power shortage on peak hour and environmental pollution caused by production of AC grid power, it is ideal to build solar energy based high power EV fast chargers.

Currently there are two different prior art configurations of solar energy based EV fast charger: (1) It uses solar energy directly to charge EV battery (DC/DC) as disclosed in U.S. Pat. Application US 2010/0181957 A1 (2) It inverts solar energy to AC power (DC/AC) first and then converts AC power back to DC (AC/DC) charging battery as disclosed in U.S. Pat. Application US 2013/0127395 A1, U.S. Pat. Application US 2011/0276194 A1 and U.S. Pat. No. 9,153,847 B2. Both configurations suffer major deficiencies. For configuration (1), the usage of solar energy is low because the unused solar energy is wasted when no EVs are in charging process. For configuration (2), the conversion efficiency of solar energy is low due to two stage conversion (the system inverts solar power to AC grid power (DC/AC) first, and then converts AC back to DC charging EV battery (AC/DC)) and the cost of the system is very high because it has two high power converters (a solar power conversion system (PCS) and an EV fast charger). Since high power EV fast charger itself contains major components of solar power system, it is desirable to add solar energy generation function into EV fast charger, namely, combining EV fast charger and solar energy generation into one system, and using single stage instead of two stage power conversion to obtain a low cost and high efficient solar energy based EV fast charging station (EVFCS).

The prior art has not set forth a low cost and high efficiency EV fast charging station with solar energy system and method that can capture and use as much solar energy as possible to fast charge EV battery and at same time produce AC grid power. The object of this invention is to provide a low cost and high efficient solar energy based high power EV fast charging station by combining EV fast charger and solar energy generation into one system which is capable of charging any EV battery with various voltage ranges by solar energy and at the same time converting solar energy to AC grid power.

SUMMARY

One non-limiting aspect of the present invention contemplates EV Fast Charging Station with Solar Energy System (EVFCS-SES) comprising a High Voltage (HV) DC bus, multiple EVFCS-SES cells connecting in parallel, a storage battery, and five operation modes: a solar energy generation mode (Mode 1), a solar energy generation plus direct storage battery charger mode (Mode 2), an EV battery charger using solar energy plus solar energy generation mode (Mode 3), an EV battery charger using storage battery and AC grid power mode (Mode 4), and a Pulse Width Modulation (PWM) rectifier battery charger mode (Mode 5).

One non-limiting aspect of the present invention contemplates an EVFCS-SES cell comprising a Multi-Function Power Conversion System (MFPCS), LCL filters plus isolation transformer, AC power grid, a solar cell, an universal battery interface, and three operation switches. The EVFCS-SES cell is operated as either a High Frequency (HF) isolated EV battery charger or a PWM rectifier storage battery charger or a three-phase solar power converter.

One non-limiting aspect of the present invention contemplates hardware of a MFPCS comprising a three phase Insulated Gate Bipolar Transistor (IGBT) module, a liquid cooled heatsink, a DC-link capacitor, a IGBT drive circuit card, a DSP interface circuit card, a DSP control Card.

One non-limiting aspect of the present invention contemplates software of a MFPCS comprising Mode 1 control library comprising three-phase grid-tied inverter control algorithms, Mode 2 control library comprising three-phase grid-tied inverter control plus direct storage battery charger control algorithms, Mode 3 control library comprising HF EV charger control algorithms and three-phase grid-tied inverter control with optimized solar power generation control algorithms, Mode 4 control library comprising HF EV charger control algorithms and PWM rectifier control algorithms, Mode 5 control library comprising PWM rectifier battery charger control algorithms.

One non-limiting aspect of the present invention contemplates a three-phase grid-tied inverter control algorithms in Mode 1 control library (to convert solar energy to AC grid power), comprising a Maximum Power Point. Tracking (MPPT) means, a DC voltage control means, a AC current reference generation means, a AC current control means, and a Space Vector Modulation (SVM) means.

One non-limiting aspect of the present invention contemplates a three-phase grid-tied inverter control plus direct storage battery control algorithms in Mode 2 control library (to produce AC grid power plus directly charge storage battery) and a three-phase grid-tied inverter control with optimized solar power generation control algorithms in Mode 3 control library (to produce AC grid power plus provide enough solar power for EV battery charger), comprising a MPPT controller, a DC voltage controller, a battery charging power calculation unit, an inverter command generation unit, an AC current reference generation unit, an AC current controller, and a SVM modulator.

One non-limiting aspect of the present invention contemplates a HF EV charger control algorithms in Mode 3 and Mode 4 control libraries (to charge EV battery with HV DC bus), comprising an EV battery data base (battery voltages, currents, temperatures, State of Charge (SOC), age, chemistry, and charging requirements for all EV battery systems), a battery voltage controller, a battery current controller, a DC current controller, a full bridge PWM modulator.

One non-limiting aspect of the present invention contemplates a PWM rectifier control algorithms in Mode 4 control library (to charge EV battery with both storage battery and AC grid power), comprising a Minimum Import AC Power Tracking (MIPT) unit, a DC voltage controller, an AC current reference generation unit, an AC current controller and a SVM modulator.

One non-limiting aspect of the present invention contemplates a PWM rectifier battery charger control algorithms in Mode 5 control library (to convert AC grid power to DC power charging storage battery), comprising a battery voltage controller, a battery current controller, an AC current reference generation unit, an AC current control controller and a SVM modulator.

One non-limiting aspect of the present invention contemplates operation switches which are operated based on an operation mode switch control table.

One non-limiting aspect of the present invention contemplates a solar energy generation mode (Mode 1) comprising a hardware configuration of three phase grid-tied inverters and software function of Mode 1 control library.

One non-limiting aspect of the present invention contemplates a solar energy generation plus direct storage battery charging mode (Mode 2) comprising a hardware configuration of three phase grid-tied inverters plus direct storage battery chargers and software function of Mode 2 control library.

One non-limiting aspect of the present invention contemplates an EV battery charger using solar energy mode (Mode 3) comprising a hardware configuration of isolated EV battery charger and three phase grid-tied inverters, and software function of Mode 3 control library.

One non-limiting aspect of the present invention contemplates an EV battery charger using storage battery and AC grid power mode (Mode 4) comprising a hardware configuration of isolated EV battery charger and PWM rectifier, and software function of Mode 4 control library.

One non-limiting aspect of the present invention contemplates a PWM rectifier battery charger mode (Mode 5) comprising a hardware configuration of PWM rectifier battery charger software function of Mode 5 control library.

One non-limiting aspect of the present invention contemplates an universal battery interface (to provide the battery interface with EV battery system of any voltage range) comprising two identical re-configurable HF transformers, transformer re-configuration switches, a diode rectifier circuit, and an output L-C filter circuit.

One non-limiting aspect of the present invention contemplates two re-configurable HF transformers (to provide galvanic isolation and universal battery voltage arrangement), comprising one primary winding and two separated secondary windings, primary windings connected in parallel while the secondary windings connected in combination of series and/or parallel.

One non-limiting aspect of the present invention contemplates transformer re-configuration switches used to connect transformers secondary windings in series and/or parallel, and controlled based on transformer re-configuration control table.

One non-limiting aspect of the present invention contemplates a solar energy management method comprising an optimized solar energy software, an Internet weather channel and a electricity rate data base.

One non-limiting aspect of the present invention contemplates an EV fast charging station with solar energy system (EVFCS-SES) together with a solar energy management method comprising EVFCS-SES cells (operating either as a solar energy generation system, or as a solar energy generation plus direct storage battery charger, or as a solar energy EV charger using solar energy, or as a EV battery charger using storage battery and AC gird power, or as a PWM rectifier battery charger), and a method for managing solar energy usage by utilizing solar energy to charge EV battery, storing unused solar energy into storage battery and generating AC grid power when EV charger is unused and storage battery is full.

BRIEF DESCRIPTION OF THE DRAWINGS

The present invention is pointed out with particularity in the appended claims. However, other features of the present invention will become more apparent and present invention will be best understood by referring to the following detailed description in conjunction with the accompany drawings in which:

FIG. 3 illustrates an operation mode switch control table as contemplated by one non-limiting aspect of the present invention.

DETAILED DESCRIPTION

As required detailed embodiments of the present invention are disclosed herein; However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
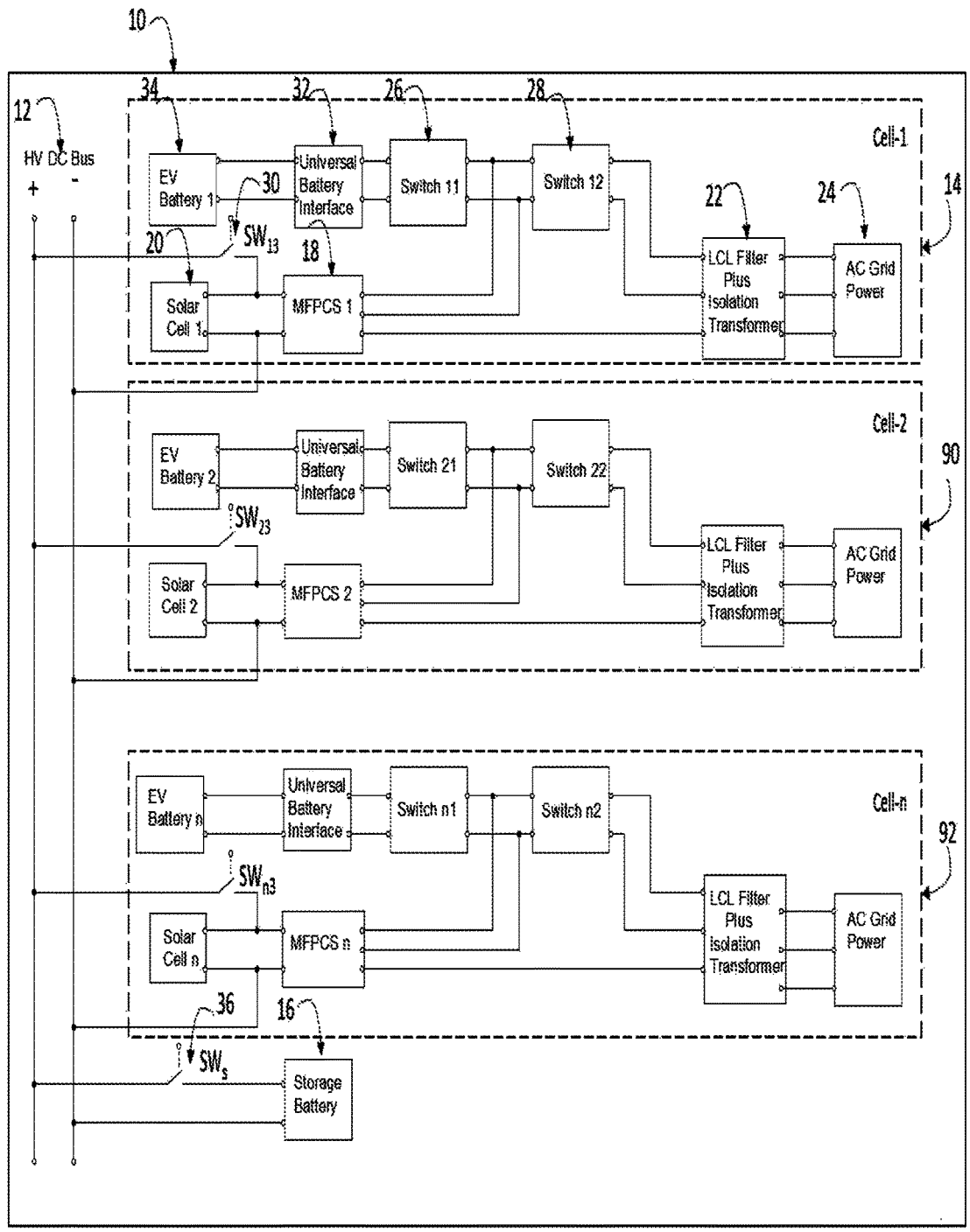
FIG. 1 illustrates the functional block diagram of an EV Fast Charging Station with Solar Energy System (EVFCS-SES) architecture contemplated by one non-limiting aspect of the present invention.

The EV Fast Charging Station/Solar Energy System (EVFCS-SES) 10 as illustrated in FIG. 1 comprises a HV DC bus 12, a number of parallel connected EVFCS-SES cells (cell-1 14, cell-2 90, and cell-n 92) and a storage battery 16. The EVFCS-SES 10 provides the following functions: (1) Converting solar power to AC grid power and storage battery power; (2) Charging EV battery with either solar power or storage battery power or AC grid power. The EVFCS-SES 10 further comprises five (5) operation modes: a solar energy generation mode (mode 1), a solar enemy generation plus direct storage battery charging mode (mode 2), a EV battery charger using solar energy mode (mode 3), a EV battery charger using storage battery and grid power mode (mode 4), and a PWM rectifier battery charger mode (mode 5).

Each EVFCS-SES cell 14, 90, 92 comprises a MFPCS 18, a solar energy source 20, LCL filters plus isolation transformer 22, AC grid power 24, operation mode switches SW11 26, SW12 28, SW13 30, an universal battery interface 32 and an EV battery 34, may be configured as either a three-phase grid-tied inverter (used in Mode 1, Mode 2, and Mode 3) which operates with solar power source 20, MFPCS 18, SW12 28, LCL filters plus isolation transformer 22 and AC grid power 24; or a High Frequency (HF) isolated EV battery charger (used in Mode 3 and Mode 4) which operates with solar power source 20, MFPCS 18, SW11 26, universal battery interface 32 and an EV battery 34; or a PWM rectifier (used in Mode 4 and Mode 5) which operates with MFPCS 18, SW12 28, SW13 30, LCL filters plus isolation transformer 22, AC grid power 24 and HV DC bus 12.

The HV DC bus 12 supported either by AC grid power 24 when EVFCS-SES cell 14 is operated as PWM rectifier or by solar power source 20 when switch SW13 30 is closed or by storage battery 16 when SWs 36 is closed, may be used as energy buffer to support different system operation modes.

Figure 2:
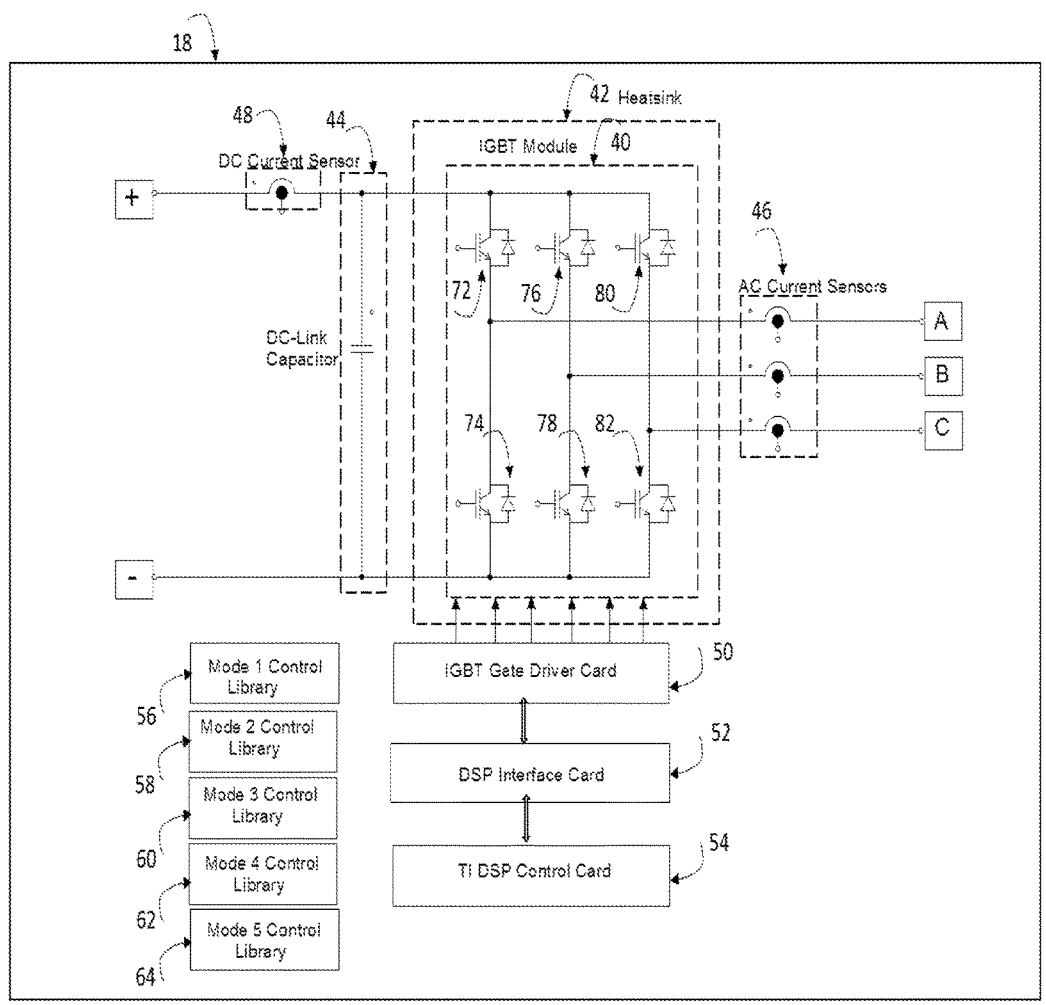
FIG. 2 schematically illustrates a Multi-Function Power Conversion System (MFPCS) as contemplated by one non-limiting aspect of the present invention.

FIG. 2 schematically illustrates MFPCS 18 having an IGBT module 40 mounted on a liquid cooled heatsink 42 and connected to DC-link capacitor 44 as contemplated by one non-limiting aspect of the present invention. The MFPCS 18 is shown for exemplary and non-limiting purpose being as a power electronic converter to facilitate AC/DC, DC/AC, DC/DC conversions utilized in EVFCS-SES cell 14 (FIG. 1).

An AC current sensing system 46 and DC current sensing system 48 may be included to sense currents to LCL filter plus isolation transformer 22 (FIG. 1), or to HF transformer primaries in universal battery interface 32 (FIG. 1) and to DC-link capacitor 44 such as to facilitate control of AC/DC, DC/AC and DC/DC power conversion processes. The DSP interface card 52 may condition and filter feedback currents from current sensors 46, 48 and other sensing devices within the system, and provide the conditioned feedback signals to DSP control card 54 for further processing. DSP control card 54 with Mode 1 control library 56, Mode 2 control library 58, Mode 3 control library 60, Mode 4 control library 62, and Mode 5 control library 64 may cooperate with DSP interface card 52 and IGBT drive card 50 to control IGBT module 40 such that opening and closing of switches 72, 74, 76, 78, 80, 82 can be coordinated to produce desired voltage/current waveform patterns for AC/DC, DC/AC and DC/DC power conversions.

FIG. 3 illustrates operation mode switch control table 84 used by MFPCS 18 to select operation mode of EVFCS-SES system. When SWs=0, SW11=0, SW12=1, SW13=0, SW21=0, SW22=1, SW23=0, SWn1=0, SWn2=1, SWn3=0, EVFCS-SES system is operated in solar power generation mode (Mode 1); When SWs=1, SW11=0, SW12=1, SW13=1, SW21=0, SW22=1, SW23=1, SWn1=0, SWn2=1, SWn3=1 EVFCS-SES system is operated in solar energy generation plus direct storage battery charger mode (Mode 2); When SWs=0, SW11=1, SW12=0, SW13=1, SW21=0, SW22=1, SW23=1, SWn1=0, SWn2=1, SWn3=1, EVFCS-SES system is operated in EV battery charger using solar energy plus solar energy generation mode (Mode 3); When SWs=1, sW11=1, SW12=0, SW13=1, SW21=0, SW22=1, SW23=1 . . . SWn1=0 SWn2=0, SWn3=0, EVFCS-SES system is operated in EV battery charger using storage battery and/or AC grid power mode (Mode 4); When SWs=1, SW11=0, SW12=1, SW13=1, SW21=0, SW22=0, SW23=0 . . . SWn1=0 SWn2=0, SWn3=0, EVFCS-SES system is operated in PWM rectifier battery charger mode (Mode 5).

Figure 4:
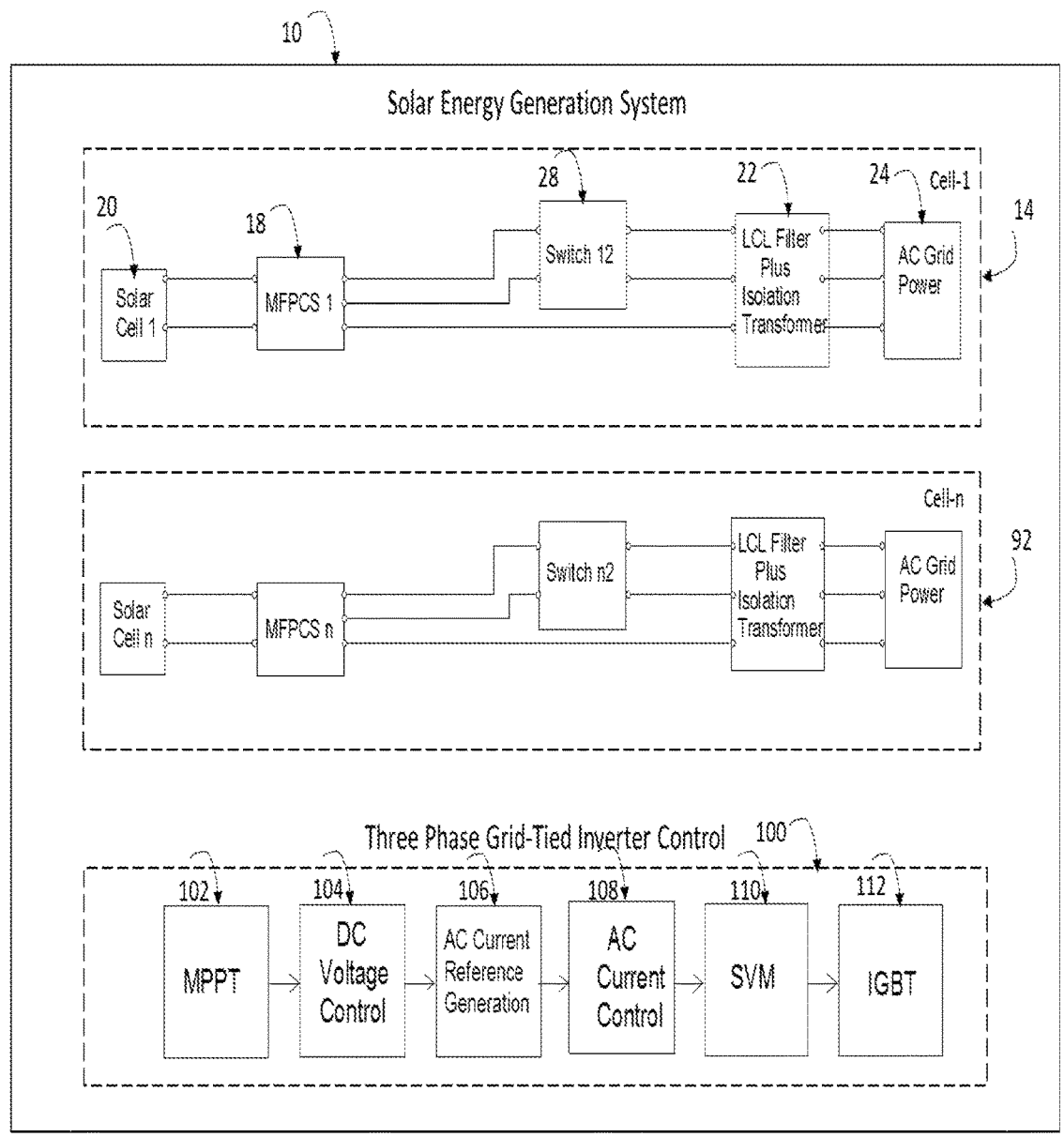
FIG. 4 illustrates the functional block diagram of solar energy generation mode (Mode 1) and its control library as contemplated by one non-limiting aspect of the present invention.

FIG. 4 illustrates functional block diagram of EVFCS-SES system 10 operated in Mode 1 configuration when solar power is present, EV battery is not present, and storage battery is full. In EVFCS-SES system 10, each EVFCS-SES cell 14, 92 has same connection patterns. For example, EVFCS-SES cell 14 having MFPCS 18 which is connected to solar power 20 and through switch SW12 28 connected to LCL filters plus isolation transformer 22 which is further connected to AC grid power 24, is configured as three-phase grid-tied inverter converting solar power to AC gird power. In Mode 1 control library which comprises three-phase grid-tied inverter control algorithm 100, the Maximum Power Point Tracking (MPPT) 102 extracts the maximum solar power by producing a dynamic voltage reference to DC voltage control 104 which regulates solar power output voltage by generating an inverter power command for AC current reference generation 106. The reference generation 106 produces current reference for AC current control 108 which regulates AC current by commanding SVM 110 to generate PWM signals controlling IGBT 112. Therefore, EVFCS-SES system 10 converts solar energy to AC grid power.

Figure 5:
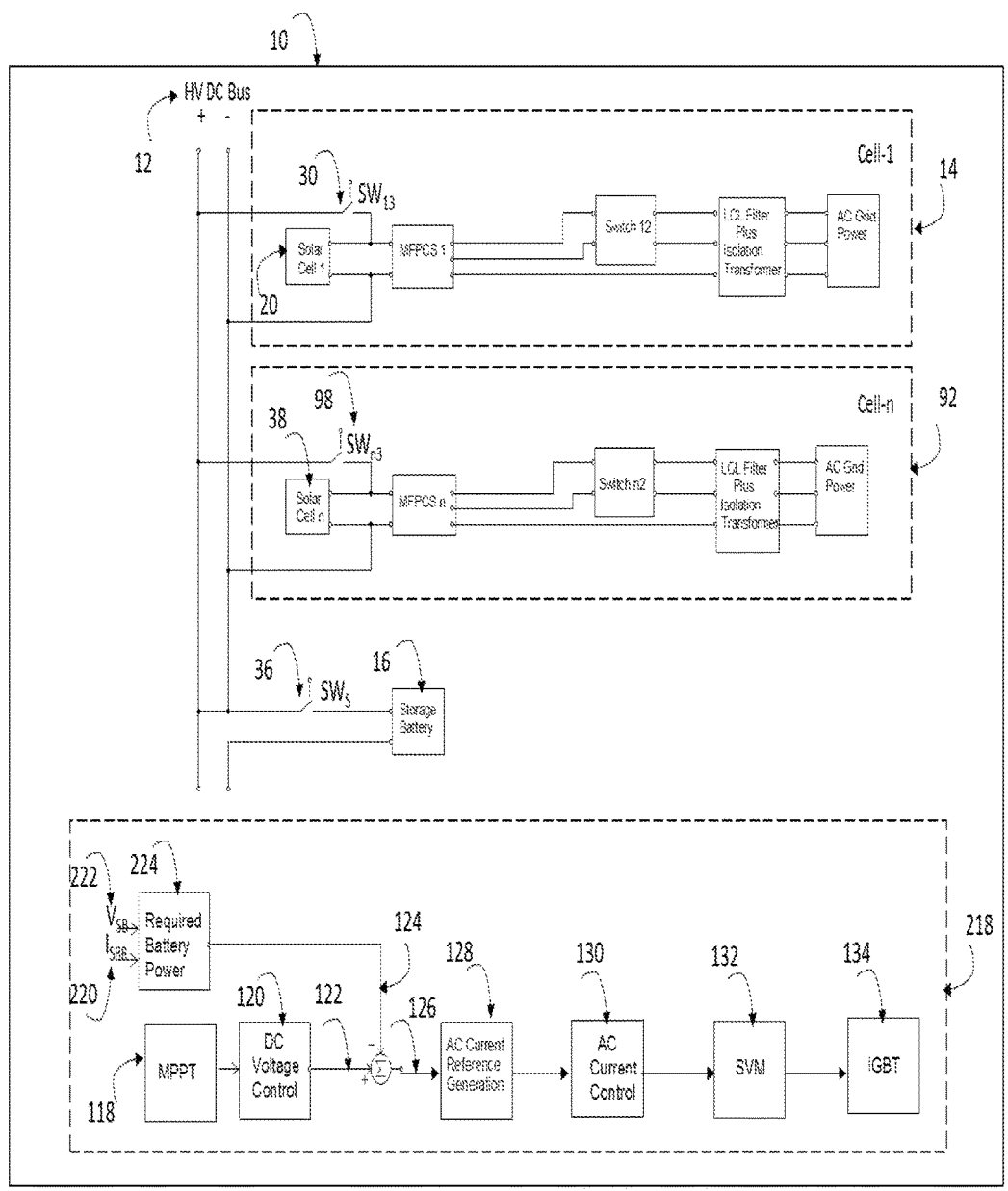
FIG. 5 illustrates the functional block diagram of solar energy direct storage battery charging plus solar energy generation mode (Mode 2) and its control library as contemplated by one non-limiting aspect of the present invention.

FIG. 5 illustrates functional block diagram of EVFCS-SES system 10 operated in Mode 2 configuration when solar power is present, EV battery is not present, and storage battery is not full. In system 10, EVFCS-SES cells 14, 92 are configured as three-phase grid-tied inverters plus solar energy direct storage battery chargers with connections to HV DC bus 12 when switches SW13 30 and SWn3 98 are closed and to storage battery 16 when switch SWs 36 is closed so that part of energy from solar cells 20, 38 is used to directly charge storage battery 16 and the rest is converted to AC grid power. Mode 2 control library comprises three-phase grid-tied inverter control plus direct storage battery charger control algorithms 218 used for EVFCS-SES cells 14, 92. In control algorithm 218, MPPT 118 extracts the maximum solar power by producing dynamic voltage reference to DC voltage control 120. DC voltage control 120 regulates DC voltage by generating solar power command 122. Required battery power calculation 224 produces required storage battery charging power 124 based on storage battery charging current reference $I_{BR}$ 220 and storage battery voltage $V_{SB}$ 222. An inverter command generation unit produces inverter power command 126 by subtracting required storage battery charging power 124 from solar power command 122. Inverter power command 126 is fed to AC current reference generation 128 to create current reference. Based on the current reference, AC current control 130 regulates AC current by commanding SVM 132 to generate PWM signals controlling IGBT 134. Therefore, EVFCS-SES system 10 charges storage battery 16 with part of solar energy 20, 38 and convert the rest to AC grid power.

Figure 6A:
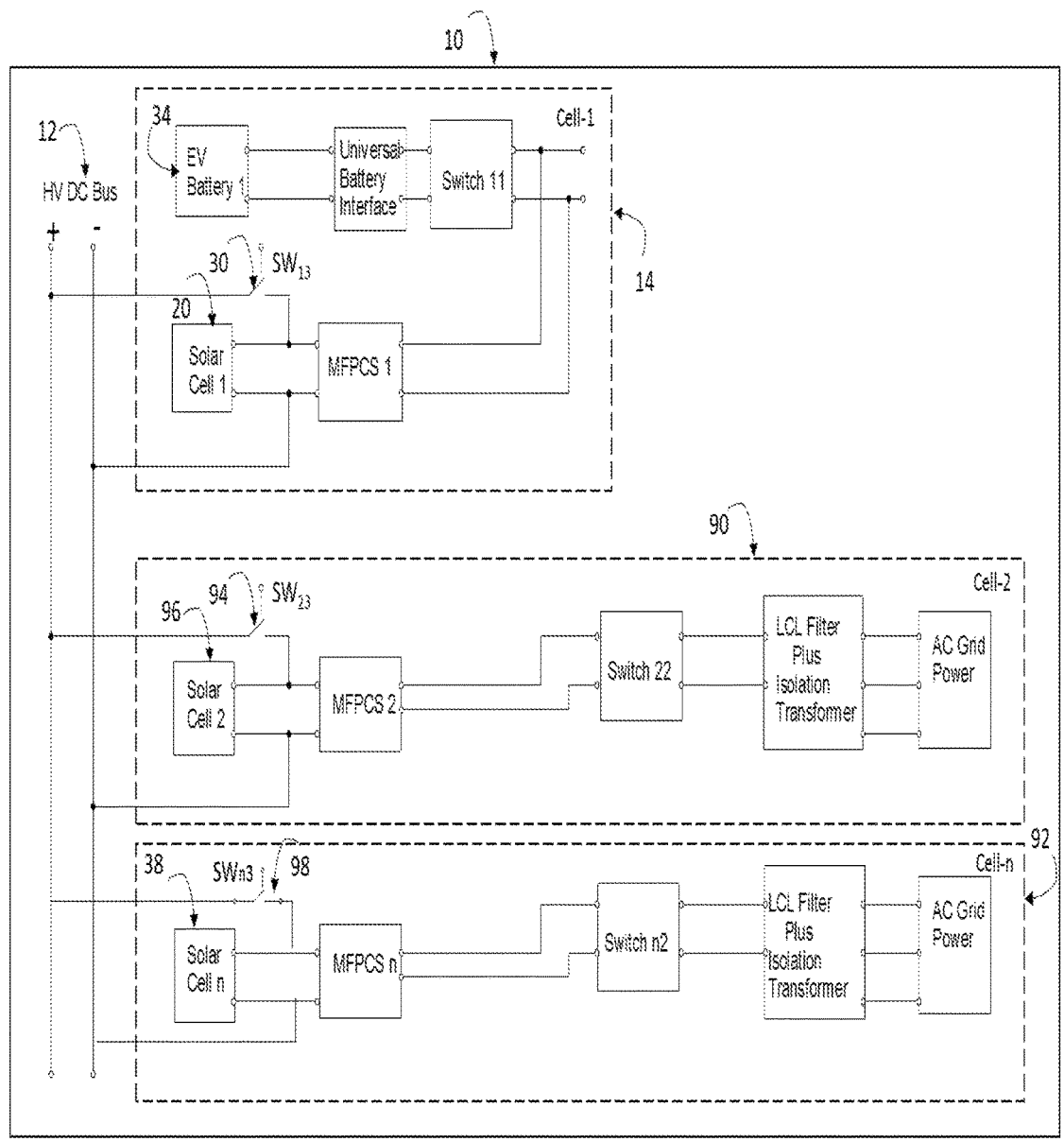
FIG. 6a illustrates the functional block diagram of EV battery charger using solar energy plus solar energy generation, mode (Mode 3) as contemplated by one non-limiting aspect of the present invention.

FIG. 6a illustrates functional block diagram of EVFCS-SES system 10 operated in Mode 3 configuration when solar power and EV battery are present. In system 10, EVFCS-SES cell 14 is configured as HF isolated EV battery charger with connection to HV DC bus 12 when switch SW13 30 is closed and EVFCS-SES cells 90, 92 are configured as three-phase grid-tied inverters with connections to HV DC bus 12 when switches SW23 94, SWn3 98 are closed. When solar cell 20 has enough energy, EVFCS-SES cell 14 charges EV battery 34 with its energy 20 and EVFCS-SES cells 90, 92 convert their solar energy 96, 38 to AC grid power. When solar cell 20 does not have enough energy, EVFCS-SES cell 14 charges EV battery 34 with the energy from solar cells 20, 96, 38 and EVFCS-SES cells 90, 92 convert rest energy from their solar cells 96, 38 to AC grid power.

Figure 6B:
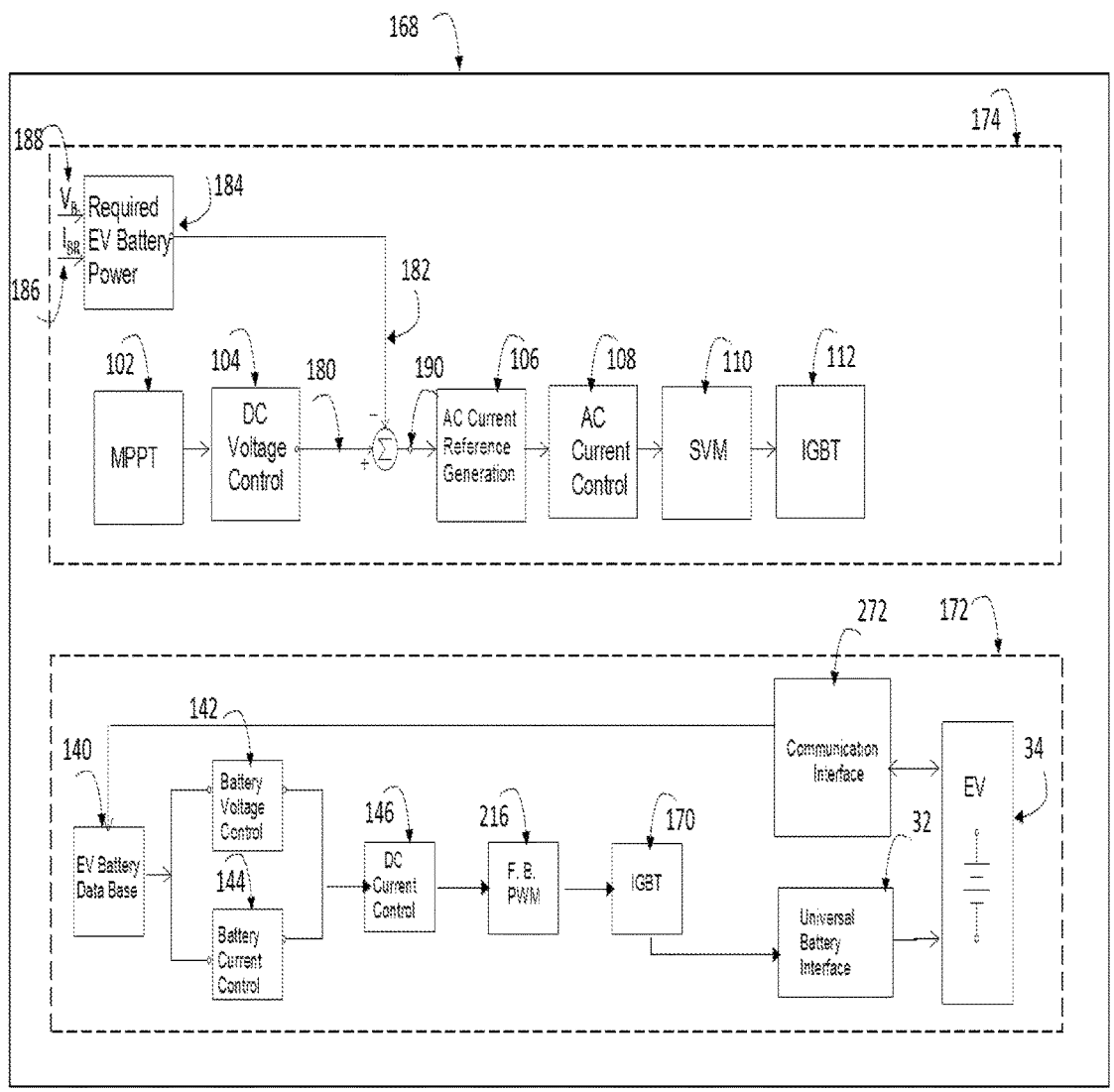
FIG. 6b illustrates the block diagram of Mode 3 control library for EV battery charger using solar energy as contemplated by one non-limiting aspect of the present invention.

Mode 3 control library 168 in FIG. 6b comprises control algorithms 172, 174. HF EV charger control algorithms 172 is used for EVFCS-SES cell 14 (FIG. 6a). Control algorithms 172 incorporates EV battery data base 140 providing battery voltage reference and battery current reference to battery voltage control 142 and battery current control 144 based on the battery information including but not limiting to EV model number and manufacturer, chemistry, voltage/current range, State of Charge (SOC), temperature and charging requirements. While battery voltage is regulated by battery voltage control 142 in constant voltage mode, the battery current is regulated by battery current control 144 in constant current mode. Using the output of either voltage control 142 or current control 144, DC current control 146 regulates DC current by commanding Full-Bridge (FB) PWM 216 to generate PWM signals controlling IGBT 170 to produce AC voltage pulse trains for universal battery interface 32 which produces optimal charging voltage and current for EV battery 34. Control algorithms 172 including a communication interface 272 which establishes an immediate communication between EV fast charging station and EV when they are connected, may automatically reconfigure hardware and select battery charging control algorithms before battery charging process begins.

The three-phase grid-tied inverter control with optimized solar power generation control algorithms 174 (FIG. 6b) is used for EVFCS-SES cells 90, 92 (FIG. 6a). In control algorithm 174, MPPT 102 extracts the maximum solar power by producing dynamic voltage reference to DC voltage control 104. DC voltage control 104 regulates DC voltage by generating solar power command 180. Required battery power calculation 184 produces required EV battery charging power 182 based on EV battery charging current reference $I_{BR}$ 186 and EV battery voltage $V_B$ 188. An inverter command generation unit produces inverter power command 190 by subtracting required EV battery charging power 182 from solar power command 180. Inverter power command 190 is fed to AC current reference generation 106 to create current reference. Based on the current reference, AC current control 108 regulates AC current by commanding SVM 110 to generate PWM signals controlling IGBT 112. Therefore, EVFCS-SES system 10 charges EV battery with part of solar energy 20, 96, 38 (FIG. 6a) and convert the rest to AC grid power.

Figure 7:
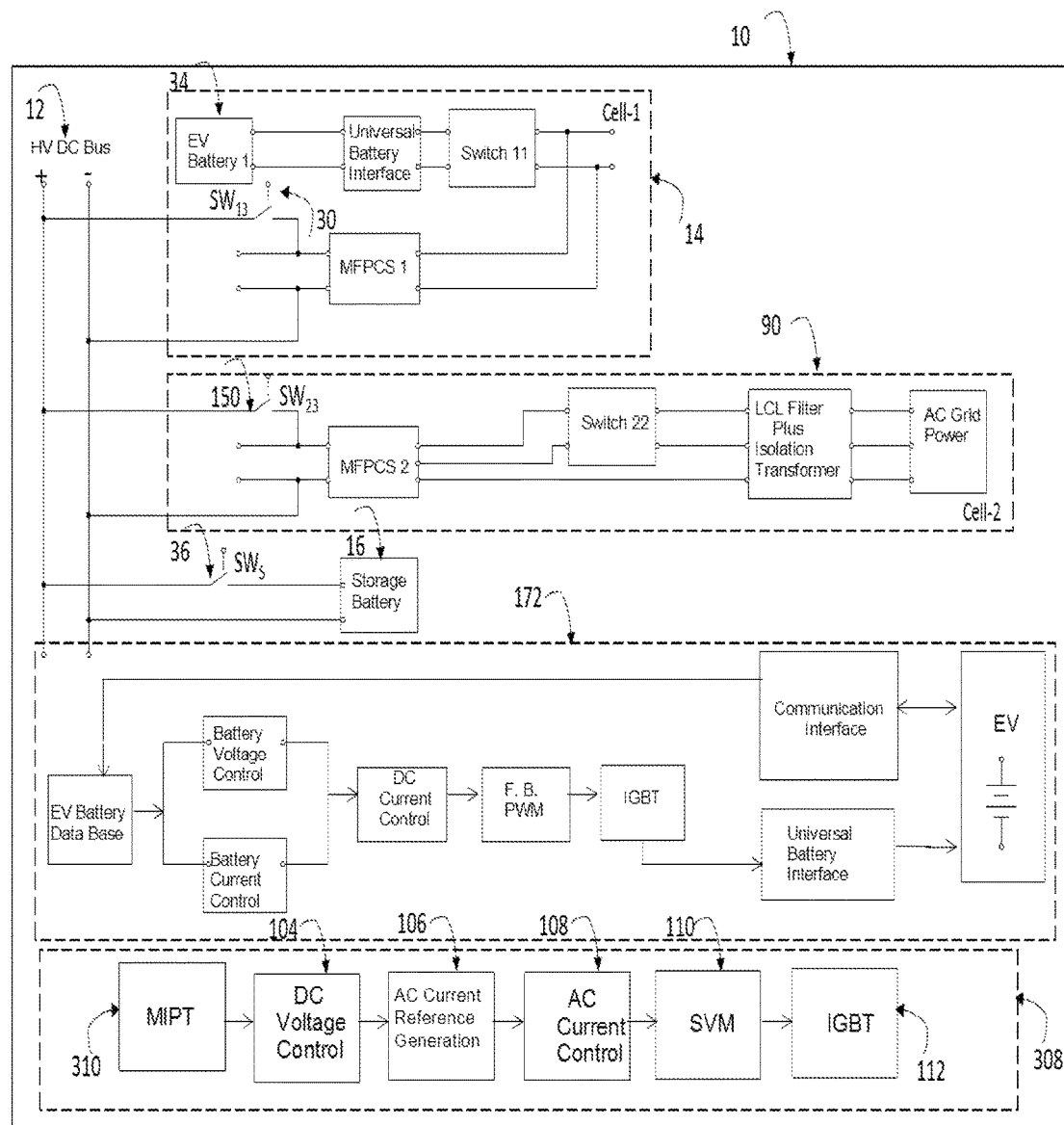
FIG. 7 illustrates the functional block diagram of EV battery charger using storage battery and/or AC grid power mode (Mode 4) and its control library as contemplated by one non-limiting aspect of the present invention.

FIG. 7 illustrates functional block diagram of EVFCS-SES system 10 operated in Mode 4 configuration when solar power is not present and EV battery is present. In system 10, EVFCS-SES cell 14 is configured as HF isolated EV battery charger connecting to HV DC bus 12 with switch SW13 30 closed to charge EV battery 34 with HV DC bus 12; EVFCS-SES cell 90 is configured as a PWM rectifier connecting to HV DC bus 12 with switch SW23 150 closed to support HV DC bus 12; storage battery 16 supports HV DC bus 12 with switch SWs 36 closed. Mode 4 control library comprises HF EV charger control algorithms 172 used for EVFCS-SES cell 14 and PWM rectifier control algorithm 308 used for EVFCS-SES cell 90. Control algorithm 172 is the same as that of Mode 3. In control algorithm 308, using information of EV battery charging power and storage battery discharging power, Minimum Import AC Power Tracking (MIPT) 310 import minimum AC grid power by providing a dynamic voltage reference to DC control 104 which regulates HV DC bus 12 by generating inverter power command for AC current reference generation 106. Reference generation 106 produces current reference for current control 108 which regulates AC current by commanding SVM 110 to generate PWM signals controlling IGBT 112. Therefore, EVFCS-SES cell 90 import minimum AC grid power to support EV battery 34 charging process.

Figure 8:
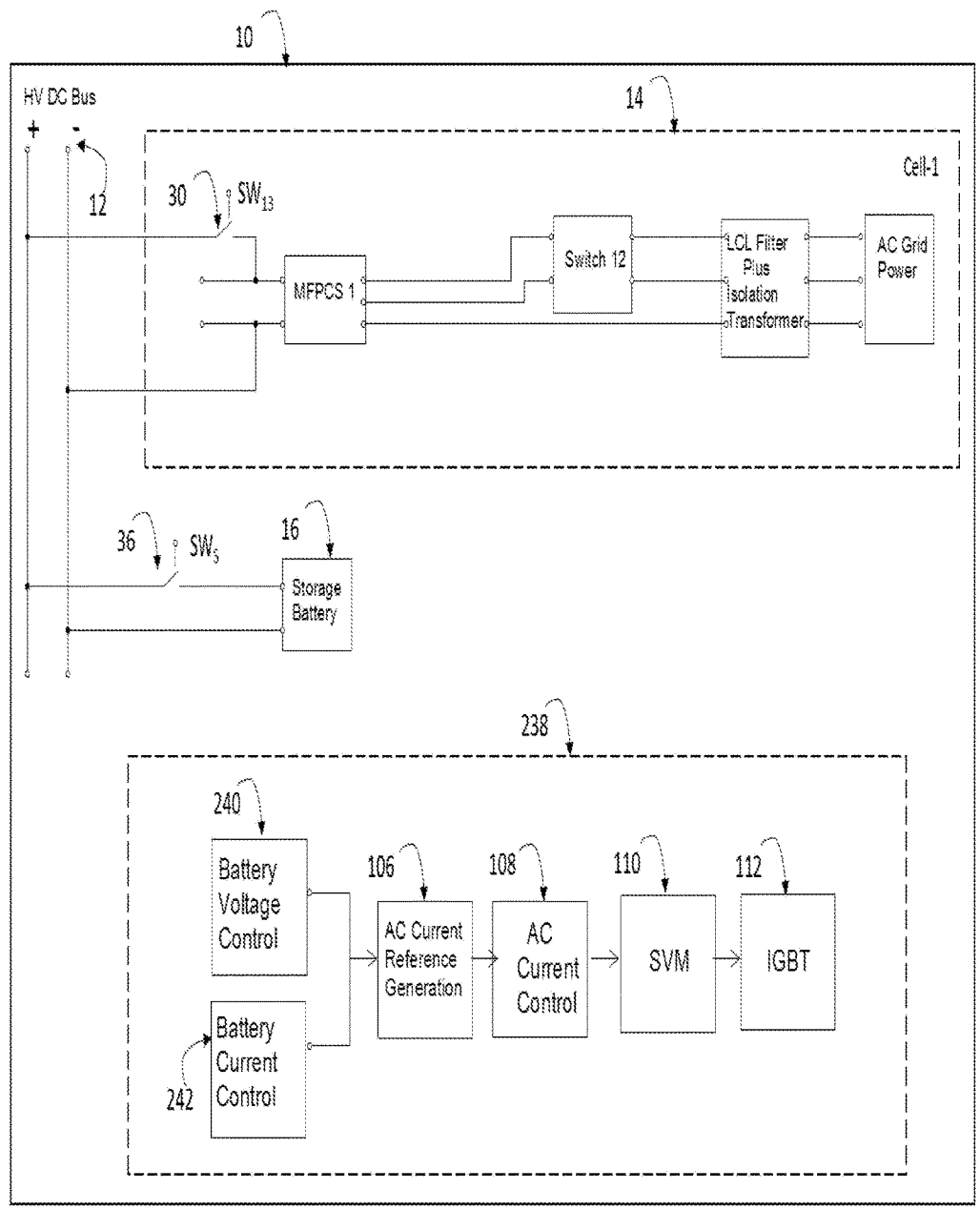
FIG. 8 illustrates the functional block diagram of PWM rectifier storage battery charger mode (Mode 5) and its control library as contemplated by one non-limiting aspect of the present invention.

FIG. 8 illustrates functional block diagram of EVFCS-SES system 10 operated in Mode 5 configuration when solar power is not present and storage battery charging is needed. In system 10, EVFCS-SES cell 14 is configured as PWM rectifier battery charger connecting to HV DC bus 12 with switch SW13 30 closed to charge storage battery 16 which is also connected to HV DC bus 12 with switch SWs 36 closed. Mode 5 control library comprises PWM rectifier battery charger control algorithms 238. In battery charger control 238, while battery voltage is regulated by battery voltage control 240 in constant voltage mode, battery current is regulated by battery current control 242 in constant current mode. Using the output of either voltage control 240 or current control 242, AC current reference generation 106 produces current reference for AC current control 108 which regulates AC current by commanding SVM 110 to generate PWM signals controlling IGBT 112. Therefore, EVFCS-SES system 10 charges storage battery 16 with AC grid power.

Figure 9A:
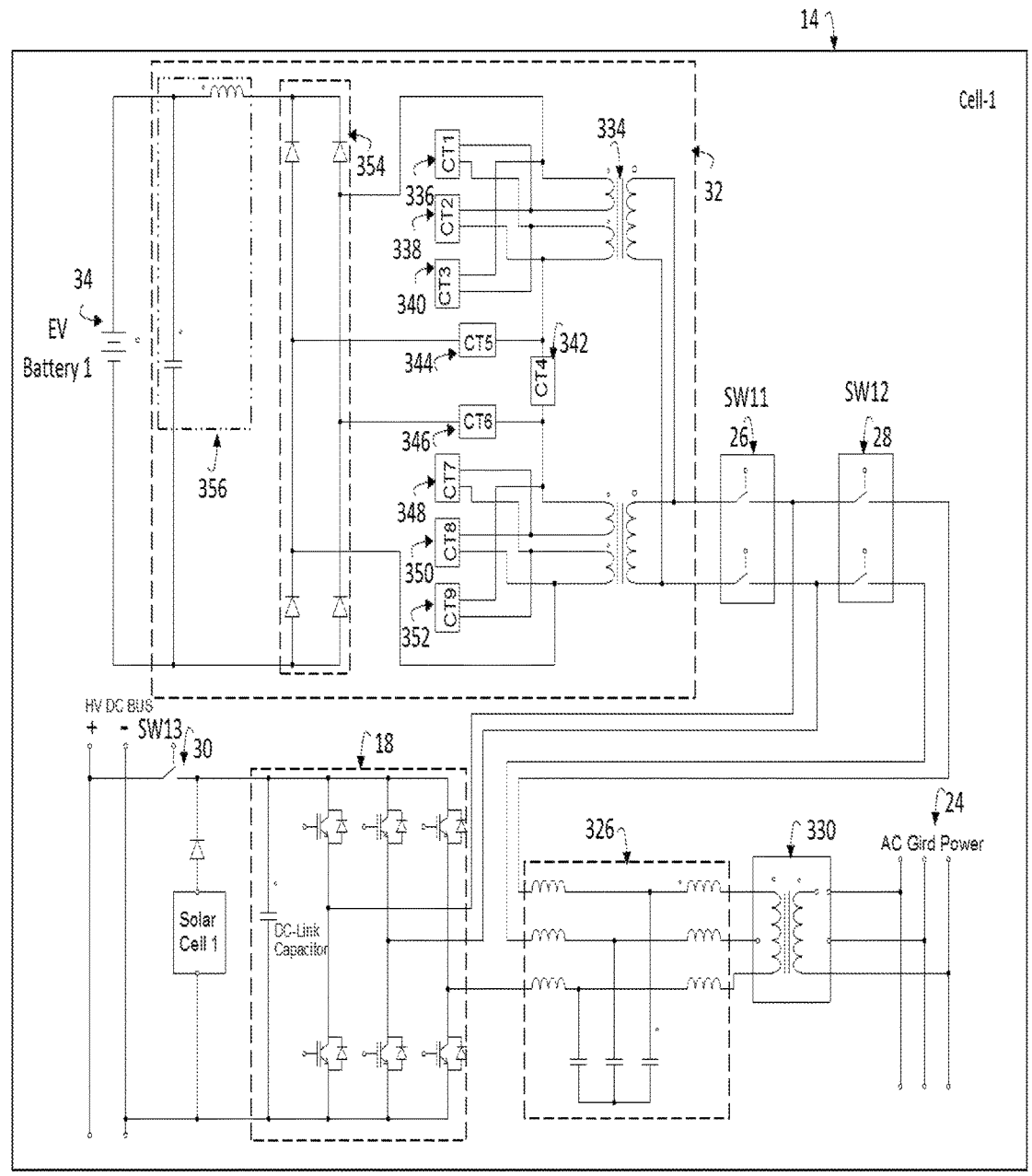
FIGS. 9a and 9b illustrate example diagrams of EVFCS-SES system as contemplated by one non-limiting aspect of the present invention.
Figure 9B:
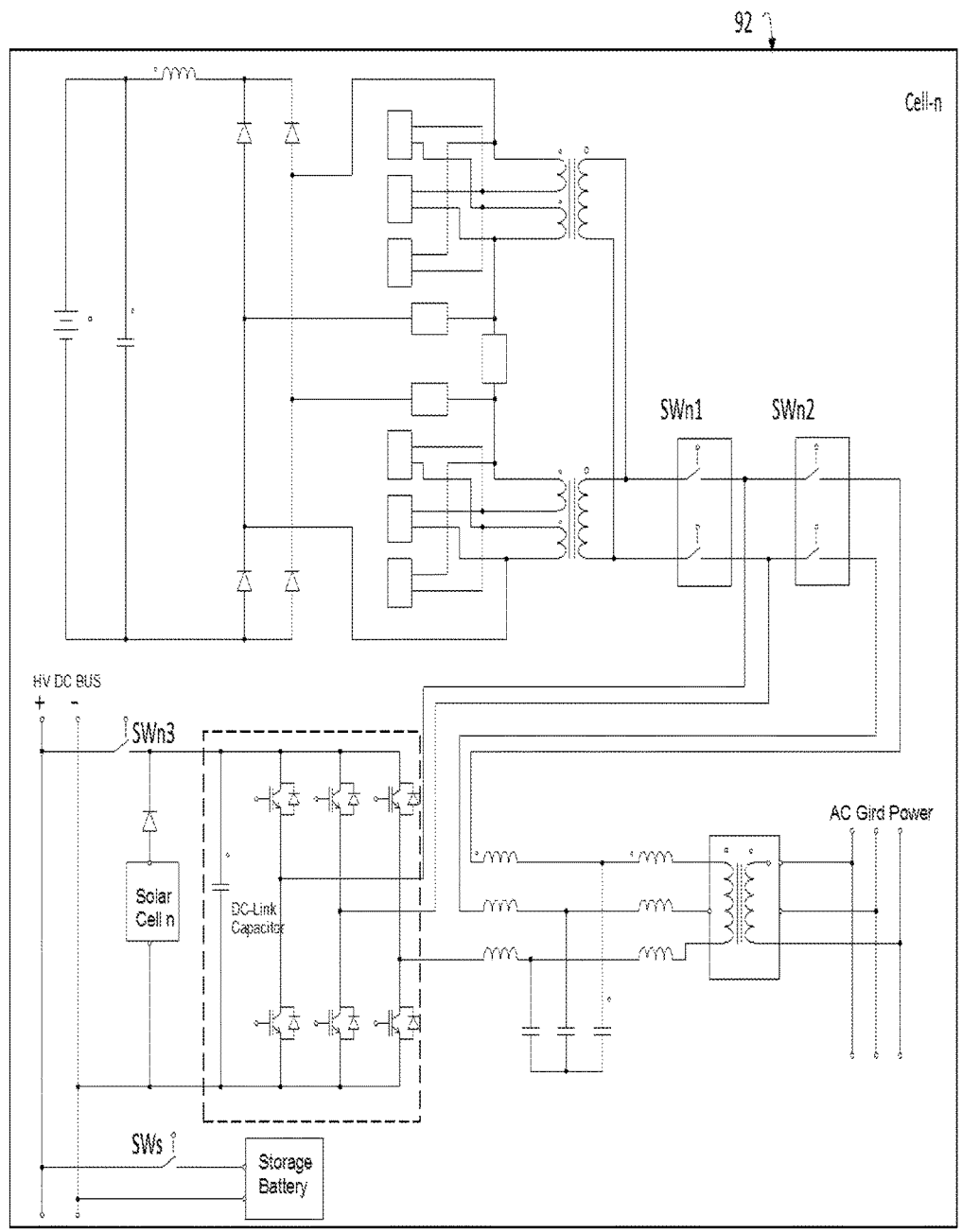

FIGS. 9a and 9b illustrate the detailed schematic circuit diagram of EVFCS-SES cell-1 14 and cell-n 92 in system 10. MFPCS 18 is used for AC/DC, DC/AC and DC/DC power conversions. LCL filter 326 is used to interface MFPCS 18 with AC grid power 24. Isolation transformer 330 provides the galvanic isolation and voltage matching between MFPCS 18 and AC grid power 24. Operation mode switches SW11 26, SW12 28, SW13 30 are used to configure system 10 in either Mode 1 or Mode 2 or Mode 3 or Mode 4 or Mode 5 operations.

Universal battery interface system 32 in FIG. 9a having two identical HF transformers 334 with one primary winding and two separated secondary windings, a set of transformer re-configuration On-Off switches CT1 336, CT2 338, CT3 340, CT4 342, CT5 344, CT6 346, CT7 348, CT8 350, CT9 352 connecting those secondary windings to a diode rectifier circuit 354 which converts AC voltage pulse trains to DC ones, and an output L-C filter 356 which eliminates HF switching harmonic components, may be re-configured automatically so that it interfaces with EV battery 34 with any voltage ranges.

The output voltage of universal battery interface 32 in FIG. 9a is determined by transformer turns ratio 14, connections of transformer primary windings and secondary windings and PWM control of MFPCS 18. Two HF transformers are configured in such way that primary windings are connected in parallel while the secondary windings are operated in combination of series and/or parallel with opening and closing of switches CT1 336, CT2 338, CT3 340, CT4 342, CT5 344, CT6 346, CT7 348, CT8 350, CT9 352 under DSP control, to match voltage level with EV battery 34.

Figures 10, 11:
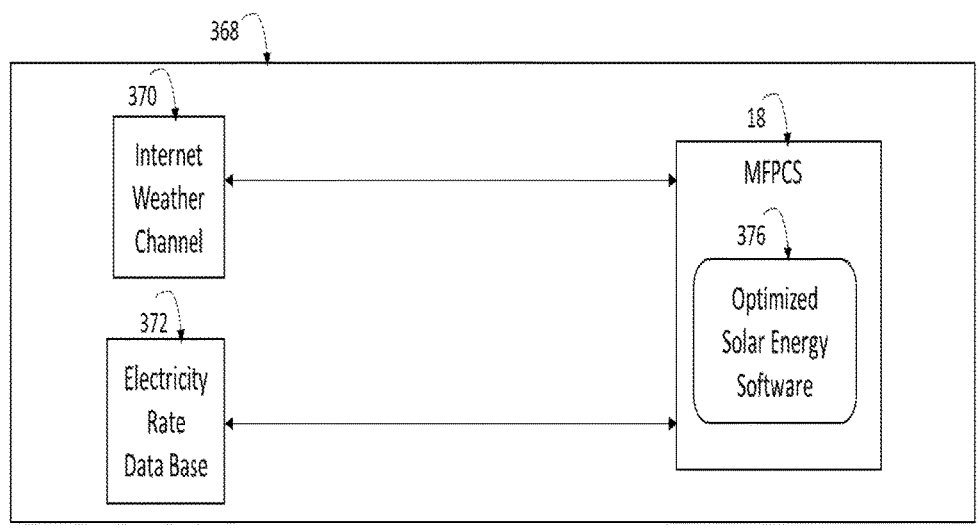
FIG. 10 illustrates High Frequency transformer re-configuration control table as contemplated by one non-limiting aspect of the present invention.
FIG. 11 illustrates the structure and mechanism of optimized solar energy software environment as contemplated by one non-limiting aspect of the present invention.

FIG. 10 illustrates transformer re-configuration control table 366 used by MFPCS 18 to achieve optimal voltage level for solar power voltage range of 300V-500V. When CT1=0, CT2=1, CT3=1, CT4=0, CT5=1, CT6=1, CT7=0, CT8=1, CT9=1, the EV fast charging station operates in battery voltage range of 150V-210V, When CT1=1, CT2=0 CT3=0, CT4=0, CT5=1, CT6=1, CT7=1 CT8=0, CT9=0, the EV fast charging station operates in battery voltage range of 300 v-420 v. When CT1=1, CT2=0, CT3=0, CT4=1, CT5=0, CT6=0, CT7=1, CT8=0, CT9=0, the EV fast charging station operates in battery voltage range of 600V-840V.

FIG. 11 illustrates the structure and mechanism of optimized solar energy software environment 368 used in EVFCS-SES system. The optimized solar energy software 376 inside of MFPCS 18 provides a solar energy management method which determines the system operation modes based on the weather condition information from internee weather channel 370, peak hour electricity rate from the data base 372, and, time of the day, State of Charge (SOC) of storage battery, charging demand for EV battery, solar cell conditions, etc.

While exemplary embodiments are described above, it is not intended that these embodiments describe all possible forms of the invention, rather, the words used in the specification are words of description rather than limitation, and it is understood that various changes may be made without depart from the sprit and scope of the invention. Additionally, the features of various implementing embodiments may be combined to form further embodiments of the invention.

What is claimed is:

1. An EV Fast Charging Station with Solar Energy System (EVFCS-SES) comprising:
    a High Voltage (HV) DC bus;
    a storage battery;
    a plurality of EVFCS-SES cells, and
    a plurality of operation modes: solar energy generation mode (Mode 1), solar energy generation plus direct storage battery charging mode (Mode 2), EV battery charger using solar energy mode plus solar energy generation mode (Mode 3), EV battery charger using storage battery and/or AC grid power mode (Mode 4), and a Pulse Width Modulation (PWM) rectifier battery charger mode (Mode 5),
    wherein, the HV DC bus is connected in parallel to the storage battery and the plurality of EVFCS-SES cells in which each cell is operated in one of the operation modes.

2. The EVFCS-SES of claim 1, wherein each EVFCS-SES cell further comprises:
    a Multi-Function Power Conversion System (MFPCS);
    a plurality of LCL filters plus isolation transformer;
    an AC power grid;
    a plurality of solar cells;
    a universal battery interface; and
    a plurality of operation mode switches,
    wherein, through the operation switches the MFPCS is connected to the plurality of solar cells, the LCL filters plus isolation transformer, the universal battery interface, and configured as either a High Frequency (HF) isolated EV battery charger or a PWM rectifier storage battery charger or a three-phase solar power converter.

3. The EVFCS-SES of claim 2, wherein the MFPCS providing DC/AC, AC/DC, and DC/DC power conversion hardware structures further comprises:
    a three phase Insulated Gate Bipolar Transistor (IGBT) module;
    a liquid cooled heatsink;
    a DC-link capacitor;
    a IGBT gate drive circuit card;
    a Digital Signal Processor (DSP) interface circuit card; and
    a DSP control Card,
    wherein the IGBT module is mounted on the liquid cooled heatsink, connected to a DC-link capacitor and controlled by three electronic circuit cards:
    the IGBT gate drive circuit card, the Digital Signal Processor (DSP) interface circuit card, the DSP control Card.

4. The EVFCS-SES of claim 2, wherein the MFPCS providing power conversion and battery charging/discharging software functions further comprises:
    a Mode 1 control library comprising three-phase grid-tied inverter control algorithms;
    a Mode 2 control library comprising three-phase grid-tied inverter control plus direct storage battery charger control algorithms;
    a Mode 3 control library comprising HF EV charger control and three-phase grid-tied inverter control with optimized solar power generation control algorithms;
    a Mode 4 control library comprising HF EV charger control and PWM rectifier control algorithms;
    a Mode 5 control library comprising PWM rectifier battery charger control algorithms.

5. The EVFCS-SES of claim 4, wherein said three-phase grid-tied inverter control algorithms in Mode 1 control library converting solar energy to AC grid power further comprises:
    a Maximum Power Point Tracking (MPPT) controller to extract the maximum solar energy by producing a dynamic voltage reference;

a DC voltage controller regulating the output voltage of solar energy with the dynamic voltage reference by generating an inverter power command;

an AC current reference generation unit producing an AC current reference with the inverter power command;

an AC current controller regulating AC current with the AC current reference by generating a command voltage; and a Space Vector Modulation (SVM) modulator generating PWM signals based on the command voltage.

6. The EVFCS-SES of claim 4, wherein said three-phase grid-tied inverter control plus direct storage battery control algorithms in Mode 2 control library directly charging storage battery using solar energy/producing AC grid power, and three-phase grid-tied inverter control with optimized solar power generation control algorithms in Mode 3 control library producing AC grid power with solar energy further comprise:

a MPPT controller extracting the maximum solar power by producing a dynamic voltage reference:

a DC voltage controller regulating solar power output voltage with the dynamic voltage reference by generating an solar power command;

a required battery power calculation unit calculating a required battery charging power command;

an inverter command generation unit producing a inverter power command with the solar power command and the required battery charging power command;

an AC current reference generation unit producing an AC current reference with the inverter power command;

an AC current controller regulating AC current with the AC current reference by generating a PWM command voltage; and a SVM modulator generating PWM signals based on the PWM command voltage.

7. The EVFCS-SES of claim 4, wherein said HF EV charger control algorithms in Mode 3 and Mode 4 control libraries charging EV battery with the HV DC bus further comprises:

an EV battery data base with the information of voltages, currents, temperatures, State of Charge (SOC), age, chemistry, and charging requirements for all EV battery systems;

a battery voltage controller regulating battery voltage in constant voltage mode;

a battery current controller regulating battery current in constant current mode;

a DC current controller regulating DC current with the output of either the battery voltage controller or the battery current controller by generating a PWM command voltage;

a full bridge PWM modulator generating PWM signals based on the PWM command voltage.

8. The EVFCS-SES of claim 4, wherein said PWM rectifier control algorithms in Mode 4 control library charging EV battery with the storage battery and/or the AC grid power further comprises a Minimum Import AC Power Tracking (MIPT) unit importing minimum AC grid power by providing a dynamic voltage reference;

a DC voltage controller regulating the HV DC bus with the dynamic voltage reference by generating a inverter power command;

an AC current reference generation unit producing an AC current reference from the inverter power command;

an AC current controller regulating AC current based on the AC current reference by generating a PWM command voltage; and a SVM modulator generating PWM signals based on the PWM command voltage.

9. The EVFCS-SES of claim 4, wherein said PWM rectifier battery charger control algorithms in Mode 5 control library charging the storage battery with the AC grid power further comprises:

a battery voltage controller regulating battery voltage by generating a inverter power command in constant voltage mode;

a battery current controller regulating battery current by generating a inverter power command in constant current mode;

an AC current reference generation unit producing an AC current reference with the inverter power command from either the battery voltage controller or the battery current controller:

an AC current controller regulating AC current based on the AC current reference by generating a PWM command voltage; and a SVM modulator generating PWM signals based on the PWM command voltage.

10. The EVFCS-SES of claim 2, wherein said operation switches are operated based on an operation mode switch control table.

11. The EVFCS-SES of claim 1, wherein said solar energy generation mode (Mode 1) further comprises a hardware configuration of three phase grid-tied inverters and software function of Mode 1 control library.

12. The EVFCS-SES of claim 1, wherein said solar energy generation plus direct storage battery charging mode (Mode 2) further comprises a hardware configuration of three phase grid-tied inverters plus direct storage battery chargers and software function of Mode 2 control library.

13. The EVFCS-SES of claim 1, wherein said EV battery charger using solar energy mode (Mode 3) further comprises a hardware configuration of HF isolated EV battery charger and three phase grid-tied inverters, and software function of Mode 3 control library.

14. The EVFCS-SES of claim 1, wherein said EV battery charger using storage battery and/or AC grid power mode (Mode 4) further comprises hardware configurations of HF isolated EV battery charger and PWM rectifier, and software function of Mode 4 control library.

15. The EVFCS-SES of claim 1, wherein said PWM rectifier battery charger mode (Mode 5) further comprises a hardware configuration of PWM rectifier battery charger and software function of Mode 5 control library.

16. The EVFCS-SES of claim 2, wherein said universal battery interface providing an interface to adapt any EV battery voltage range further comprises:

two identical re-configurable HF transformers transmitting HF AC voltage pulse trains;

a plurality of transformer re-configuration switches;

a diode rectifier circuit converting the AC voltage pulse trains to DC ones; and an output L-C filter circuit eliminating HF switching harmonic components.

17. The EVFCS-SES of claim 16, wherein said re-configurable HF transformers providing galvanic isolation and universal battery voltage arrangement further comprises:

one primary winding; and two separated secondary windings, wherein the primary windings are connected in parallel while the secondary windings are connected in combination of series and/or parallel.

18. The EVFCS-SES of claim 16, wherein said transformer re-configuration switches connecting transformer secondary windings in series and/or parallel are controlled based on a transformer re-configuration control table.

19. An EV fast charging station with solar energy system (EVFCS-SES) together with a solar enemy management method comprises:
   a plurality of EVFCS-SES operated either as three phase grid-tied inverters, or as solar energy direct storage battery chargers, or High Frequency (HF) EV battery chargers, or as PWM rectifiers, or as PWM rectifier battery charger;
   the solar energy management method managing solar energy usage by utilizing solar energy to charge the EV battery, to store unused energy into the storage battery for later use, and to generate AC grid power when EV charger is unused and storage battery is full.

* * * * *